C. D. ARMSTRONG.
DISH CLEANER.
APPLICATION FILED JUNE 21, 1920.
1,398,664.
Patented Nov. 29, 1921.
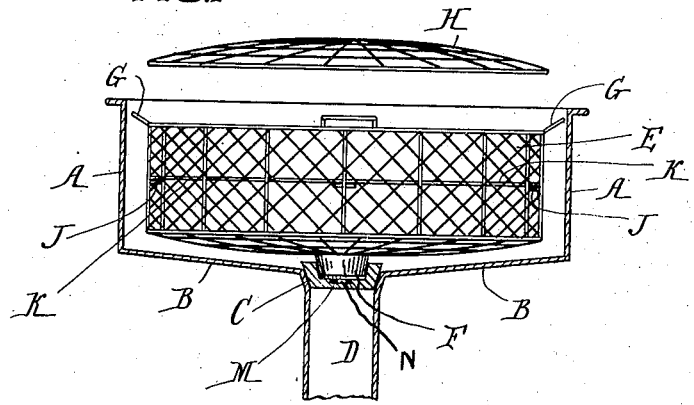
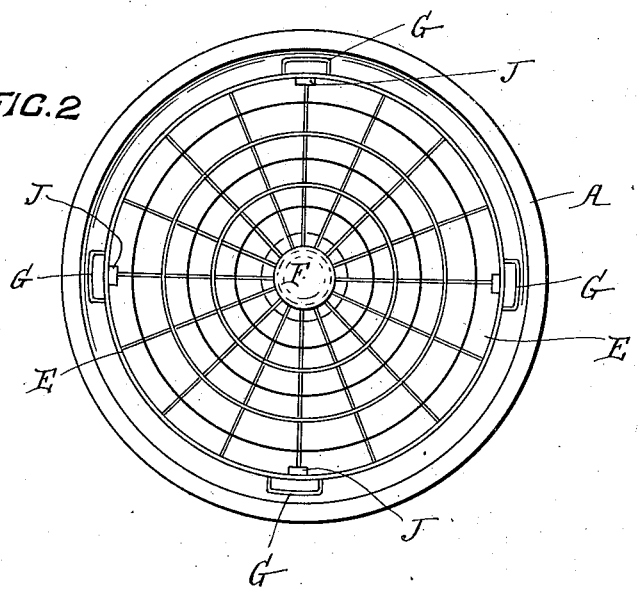
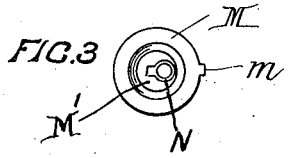
Inventor
Constance D. Armstrong,
By B. Singer, Atty.

UNITED STATES PATENT OFFICE.

CONSTANCE DURELL ARMSTRONG, OF GISBORNE, NEW ZEALAND.

DISH-CLEANER.

1,398,664.  Specification of Letters Patent.  Patented Nov. 29, 1921.

Application filed June 21, 1920. Serial No. 390,460.

*To all whom it may concern:*

Be it known that I, CONSTANCE DURELL ARMSTRONG, subject of the King of Great Britain, residing at 518 Childers road, Gisborne, New Zealand, have invented new and useful Improvements in or Relating to Dish-Cleaners; and I do hereby declare the following to be a full, clear, and exact description of the same.

This invention has been devised with the object of providing an improved construction of kitchen sink more especially adapted for the purposes for which such sinks are generally employed and also by means of which the discharge of the water therefrom will be fast and to a central point such as to cause an effective scouring of the sink by the discharge. The invention also embodies with such form of sink special dish washing means designed to rapidly and effectively wash dishes placed therein.

The invention will be fully described in relation to the accompanying sheet of drawings, in which:—

Figure 1 is a sectional elevation of the improved sink showing, in elevation, a dish washing cage in position therein.

Fig. 2 is a plan thereof.

Fig. 3 is a plan of the sink plug as designed for use with the dish washing cage shown in Figs. 1 and 2.

According hereto the sink A is made of circular form and of any of the known materials used for the construction of these articles, and with a bottom B sloping downward all around, to a central discharge aperture C to which the waste pipe D is attached. The sink is fitted or installed in any approved manner, and upon the usual lines adopted in the installation of these appliances.

This circular shape of the sink combined with the bottom sloping downward to its central discharge, will provide for the rapid discharge of water therefrom and for a scouring action that will serve to carry away any contained dirt, grease, etc., before it has time to settle especially if the water is given a swirling agitation while discharging.

The dish washing means for combination with the sink consist in a circular wire work cage or basket E made of approved material and of sufficient strength to hold the weight of dishes represented by its capacity. This cage or basket has a circular metallic block F secured upon its bottom at the center thereof. It is also furnished with handles G at intervals around its top edge by means of which it may be lifted out of and into the sink A. It may also be supplied with a wirework cover H, shown in Fig. 1 elevated above its top, to fit on to and close the open top thereof. This cover has suitable means for securing it in position. In addition, the cage may be provided with ledges J at intervals around its inside at about half way in its height. These ledges are used to support a wire grid K extending over the area of the cage and employed to either divide the cage into upper and lower compartments for the stacking of crockery therein, or to support plates and the like on their edges so that clear open spaces are left between the surfaces of adjacent plates.

The plug M for closing the sink discharge C is in this invention made with a circular recess M' in its top face. A pull ring N is arranged within the recess and attached to the top of the plug. This recess is made of a diameter to receive the block F upon the bottom of the cage E and to form a loose fit therefor. It is also made of approved depth and the block of corresponding height to form sufficient bearing to maintain the cage in the horizontal position within the sink when the block is inserted in the recess. The cage is thus capable of being rotated with this block as a pivot trunnion.

Consequently when the cage has the dishes properly stacked within it and the cover secured over them, and is placed within the sink and the sink filled with hot water, its rotation in the sink in reverse directions will effectually rinse the dishes with the water so that they will be cleaned in the desired manner. In this manner they may be treated to repeated washings or rinsings in fresh water, the dirty water each time being discharged by removing the cage and lifting the sink plug. The cage is then finally lifted out and the dishes allowed to drain and dry.

The sink plug M will be held firmly in its place so as to permit of the cage freely revolving within it, by forming it with a small lug m on its edge that engages in a correspondingly shaped depression in its seat in the sink discharge aperture.

I claim:—

1. A sink having a closure plug fitted in its waste pipe and a cage mounted directly on said plug for rotation in the sink.

2. A sink having a closure plug detachably fitted in its waste pipe, said plug having a bearing recess in its upper side, and a cage arranged in said sink and having a central supporting member detachably and revolubly mounted in the recess of said plug.

In testimony whereof, I have signed this specification in the presence of two subscribing witnesses.

CONSTANCE DURELL ARMSTRONG.

Witnesses:
C. G. BAYLISH,
M. E. MATTHEWS.